United States Patent
Jackson

(10) Patent No.: US 7,434,929 B2
(45) Date of Patent: Oct. 14, 2008

(54) SWEAT LINER FOR GLASSES

(76) Inventor: Todd Jackson, 122 Buckhead Ct., Brentwood, TN (US) 37027

( * ) Notice: Subject to any disclaimer, the term of this patent is extended or adjusted under 35 U.S.C. 154(b) by 0 days.

(21) Appl. No.: 11/233,663

(22) Filed: Sep. 23, 2005

(65) Prior Publication Data

US 2006/0066807 A1 Mar. 30, 2006

Related U.S. Application Data

(60) Provisional application No. 60/613,182, filed on Sep. 24, 2004.

(51) Int. Cl.
G02C 11/08 (2006.01)
(52) U.S. Cl. .............................. 351/62; 2/12
(58) Field of Classification Search .................. 351/62, 351/41, 44, 158; 2/10, 12, 431, 435, 440, 2/442
See application file for complete search history.

(56) References Cited

U.S. PATENT DOCUMENTS

| | | | |
|---|---|---|---|
| 3,133,982 A * | 5/1964 | Janz | ............................ 351/62 |
| 3,419,909 A * | 1/1969 | Spain | ............................. 2/174 |
| 4,616,367 A | 10/1986 | Jean, Jr. et al. | |
| 4,811,430 A | 3/1989 | Janusz | |
| 4,885,808 A | 12/1989 | Carpenter | |
| 4,934,807 A * | 6/1990 | Bolle et al. | ................... 351/62 |
| 5,033,122 A | 7/1991 | Smith | |
| D354,970 S | 1/1995 | Bolle | |
| D365,593 S | 12/1995 | Leonardi | |
| D374,114 S | 10/1996 | Arroyo et al. | |
| 5,636,388 A | 6/1997 | Hodges | |
| 5,647,061 A | 7/1997 | Marcus | |
| 5,740,556 A | 4/1998 | Brown | |
| 5,771,500 A | 6/1998 | Mayes | |
| 5,818,569 A | 10/1998 | Berent | |
| 6,026,518 A | 2/2000 | Brown | |
| 6,282,727 B1 * | 9/2001 | Lindahl | ......................... 2/428 |

OTHER PUBLICATIONS

U.S. Appl. No. 10/314,144, filed Dec. 9, 2002, Thorson.

* cited by examiner

*Primary Examiner*—Hung X Dang
(74) *Attorney, Agent, or Firm*—Wayne Edward Ramage; Baker Donelson

(57) ABSTRACT

An liner apparatus to prevent sweat, water, lotions, or other fluids or debris from running into the eyes of the wearer of a pair of glasses or sunglasses while still allowing unrestricted vision and air circulation. One or more liners extend from the top of the frame of the glasses to the forehead or orbital area of the wearer. A single liner may extends across the entire top of the frames, or two liners may each extend across the top of the right and left lens sections. The liner or liners may be attached to the frame by a variety of means, including removable means, such as a tab or lip integral with the liner and adapted to fit over the top of the frame. A flap may extend from the back of the liner to ensure contact with the wearer. One or more grooves may also be located in the top of the liner to collect and redirect sweat and other matter away from the eyes.

15 Claims, 8 Drawing Sheets

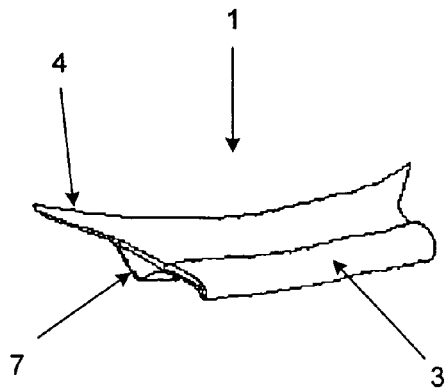
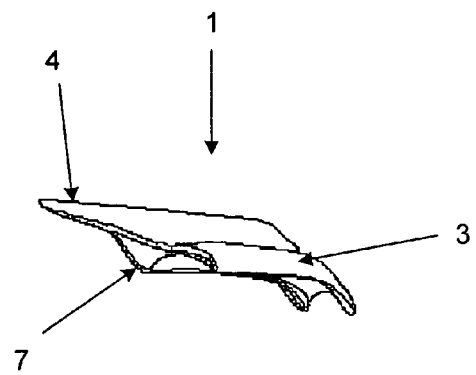
FIGURE 4A
FIGURE 4B
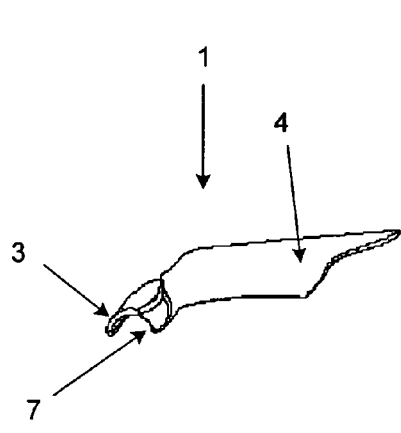
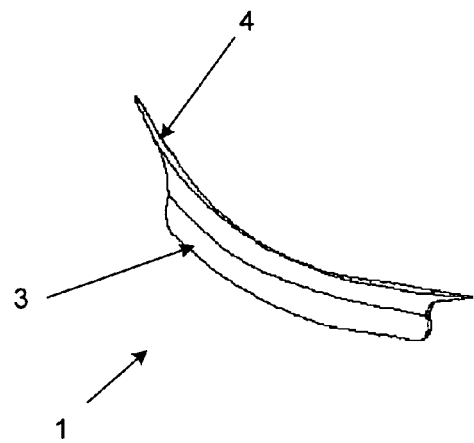
FIGURE 4C
FIGURE 4D

SWEAT LINER FOR GLASSES

This application claims benefit of the previously filed Provisional Patent Application No. 60/613,182, filed Sep. 24, 2004, by Todd Jackson, and is entitled to that filing date for priority.

FIELD OF INVENTION

This invention relates to an accessory lining to be attached to glasses. More particularly, the present invention relates to an accessory lining that is attached to various types of glasses, including designer sunglasses, to eliminate or redirect sweat from the eyes.

BACKGROUND OF INVENTION

Substantially all of the various types of athletic or sport sunglasses being manufactured for today's marketplace have been designed by the manufacturer to provide eye protection from brightness, glare, radiation, and similar effects which are associated with outdoor daytime activities. Several manufacturers, including but not limited to Adidas, Nike, Bolle, Vuarnet, Ray-Ban, Oakley, Arnette and the like, couple this functionality with a unique "designer" look. Current sport and designer sunglasses provide little or no eye protection with respect to sweat, lotions, debris, or similar fluids or objects that might seep or flow down the forehead and into the eyes. This occurs during various types of exercising (e.g., walking, running, volleyball, baseball, golf, etc.), outdoor activities (e.g., sunbathing, mowing the lawn, etc.), or virtually any number of activities that involve or cause perspiration or similar problems.

It is known in the art for work goggles and work glasses to have a variety of means of protecting the eyes. Goggles that totally enclose the eye are common, but these are heavy, bulky, and useful only in certain work or sport situations (e.g., skiing goggles), and are not generally useful as athletic or sport sunglasses. They also restrict vision and do not have the unique "designer" look desired by many consumers. Also known are sweat bands or similar mechanisms that can attach to glasses, but these also often restrict vision, and none preserve the unique "designer" look and style of the sunglasses. In addition, many such attachments are permanent, requiring the consumer to discard the glasses prematurely when the sweat band or mechanism has been overused or its condition has deteriorated.

Thus, what is needed is an accessory lining for athletic and sports sunglasses that is removably attached to the sunglasses in such a way as to eliminate or redirect sweat, lotions, or similar fluids or objects from flowing or seeping into the eyes, while preserving the unique "designer" look and style of the sunglasses.

SUMMARY OF THE INVENTION

In one exemplary embodiment, the invention comprises one or more liners attached to the top of the frame of a pair of sunglasses or glasses. The liners are made of flexible material, and extend from the frame to the forehead or orbital area of the person wearing the glasses, so as to prevent sweat, water, lotions, or other fluids or debris from running into the eyes of the wearer.

In one exemplary embodiment, a single liner extends across the entire top of the frames. In another exemplary embodiment, two liners each extend across the top of the right and left lens sections, leaving the middle section open.

The liner or liners may be attached to the frame by a variety of means, including removable means, such as a tab or lip integral with the liner and adapted to fit over the top of the frame.

In another exemplary embodiment, a flap extends from the back of the liner to ensure contact with the forehead or orbital area of the wearer. The liner and flap may be made of flexible, water resistant or waterproof material, including but not limited to rubber, plastic or foam.

In yet another exemplary embodiment, one or more grooves are located in the top of the liner to collect and redirect sweat and other matter away from the eyes. The groove or grooves may extend for the whole or partial length of the liner.

DESCRIPTION OF THE DRAWINGS

FIGS. 4A-D show perspective views of one embodiment of the present invention.

DETAILED DESCRIPTION OF THE INVENTION

Figure 1A:
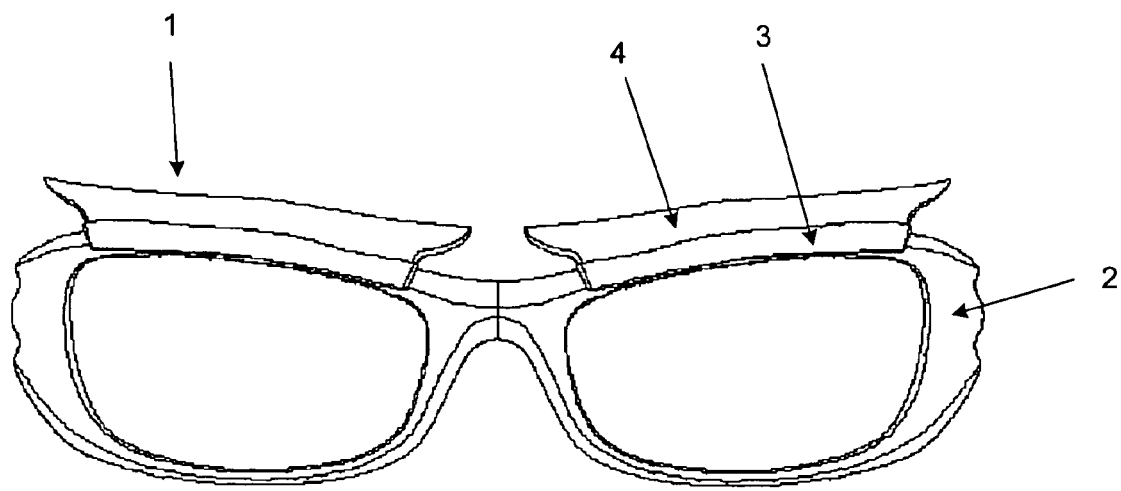
FIG. 1A shows a front view of one embodiment of the present invention attached to a pair of glasses.
Figure 1B:
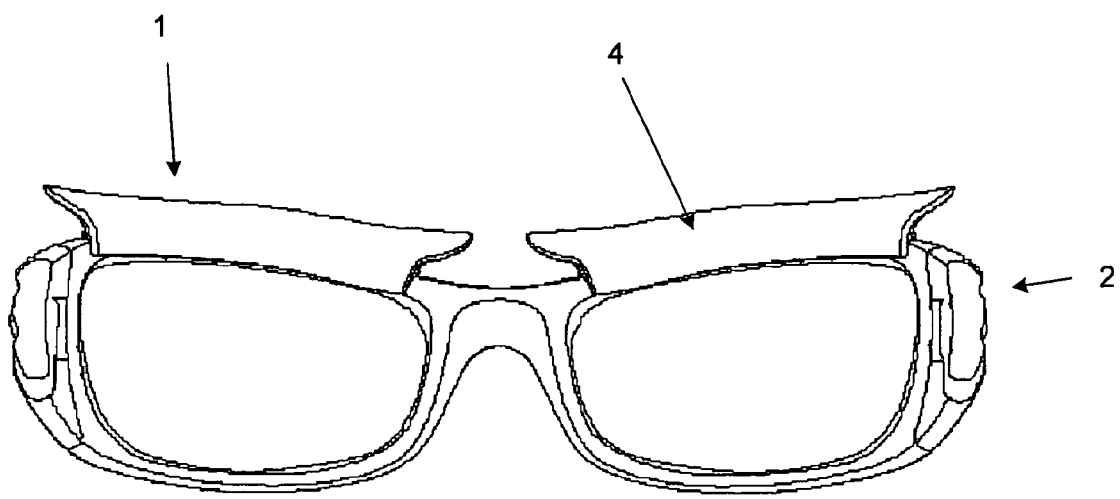
FIG. 1B shows a rear view of FIG. 1A.
Figure 2:
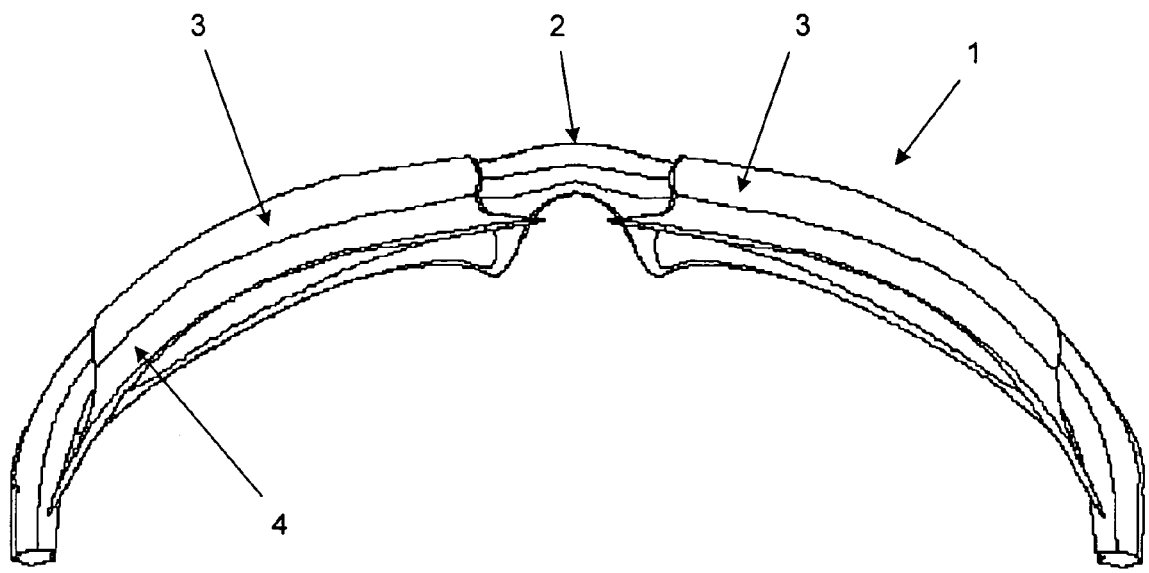
FIG. 2 shows a top view of FIG. 1A
Figure 3:
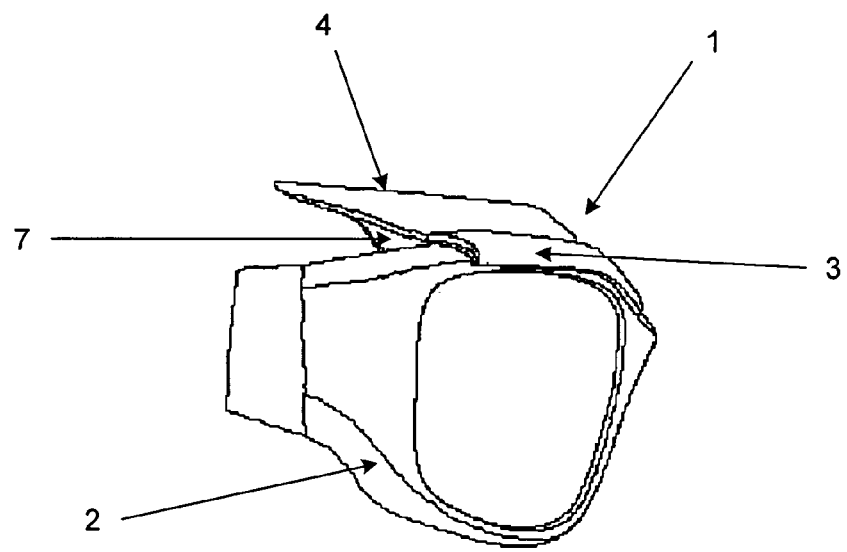
FIG. 3 shows a side view of FIG. 1A.
Figures 5, 6, 7:
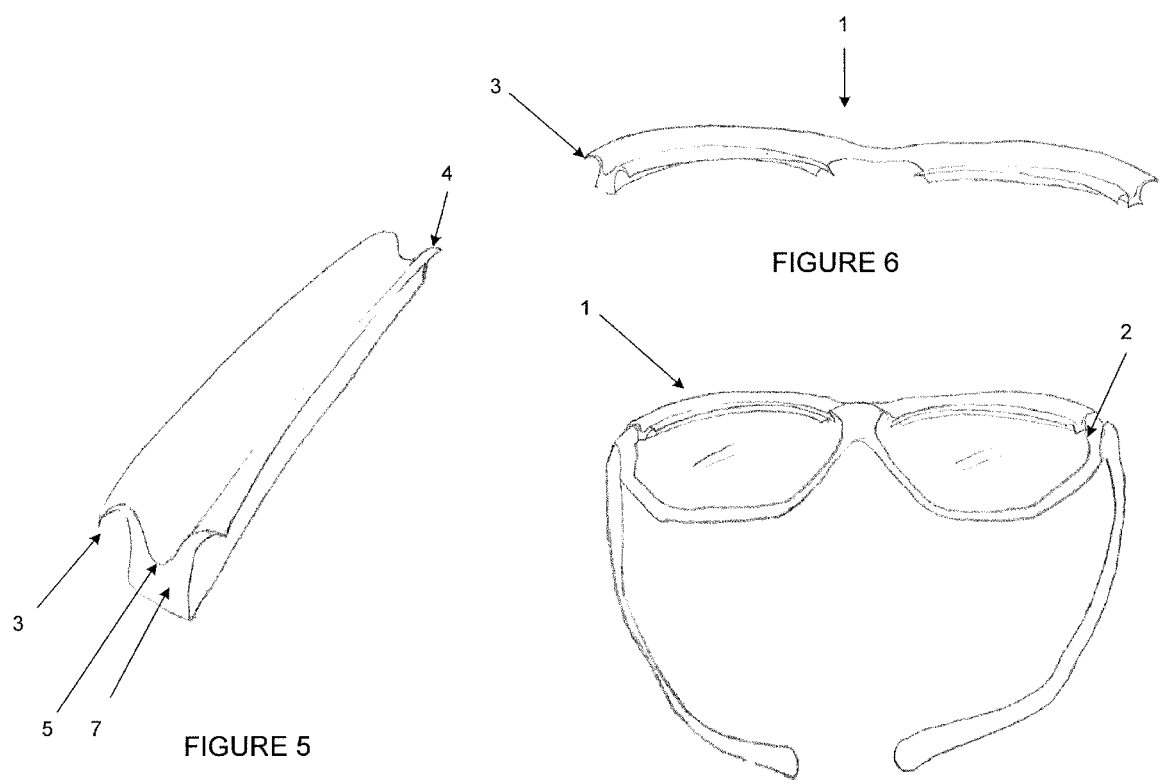
FIG. 5 shows a perspective view of one embodiment of the present invention with a groove.
FIG. 6 shows a back view of one embodiment of the present invention adapted to extend across the entire top of the frame of the glasses.
FIG. 7 shows the embodiment of FIG. 6 attached to a pair of glasses.
Figure 8A:
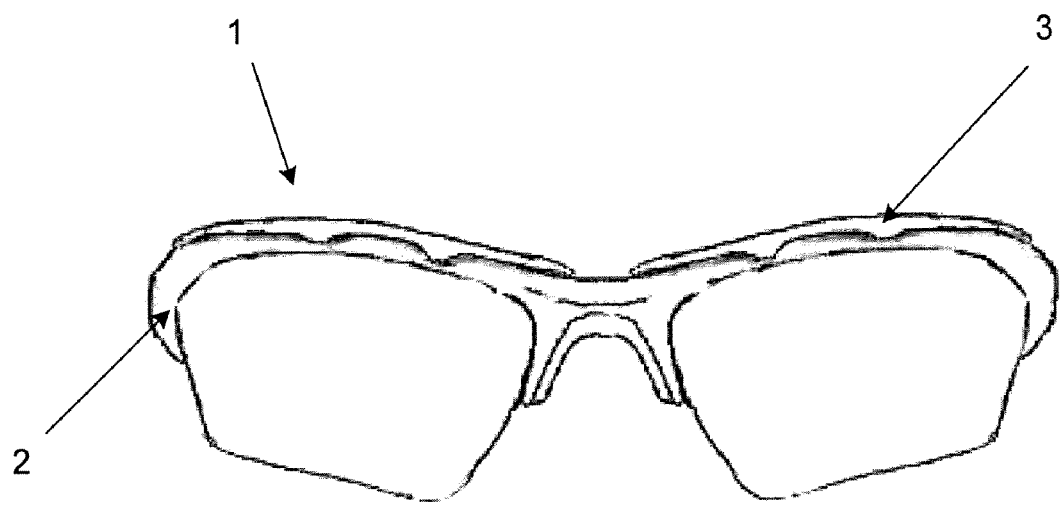
FIGS. 8A shows a front view of an embodiment of the present invention attached to a pair of glasses.
Figure 8B:
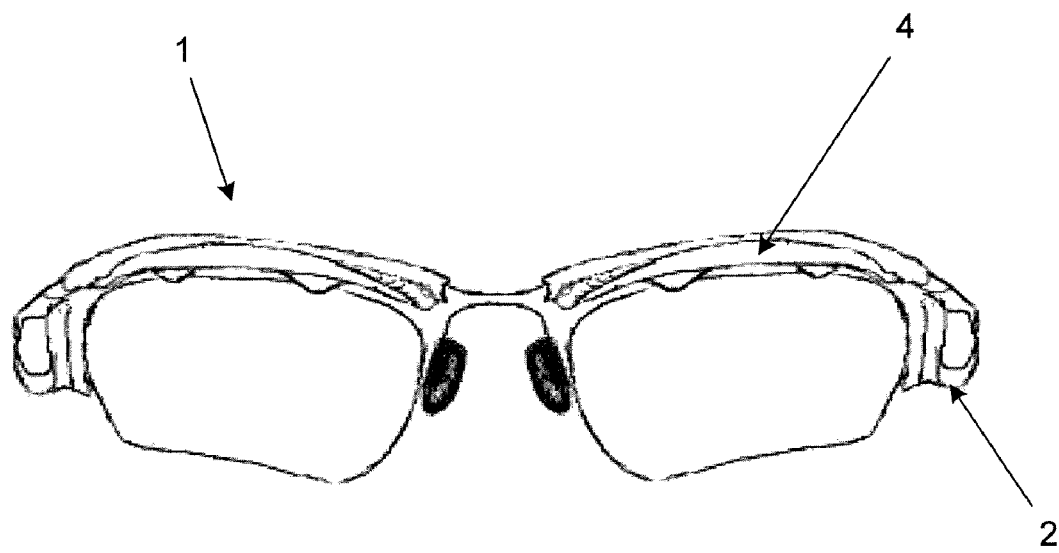
FIG. 8B shows a rear view of FIG. 8A.
Figure 9A:
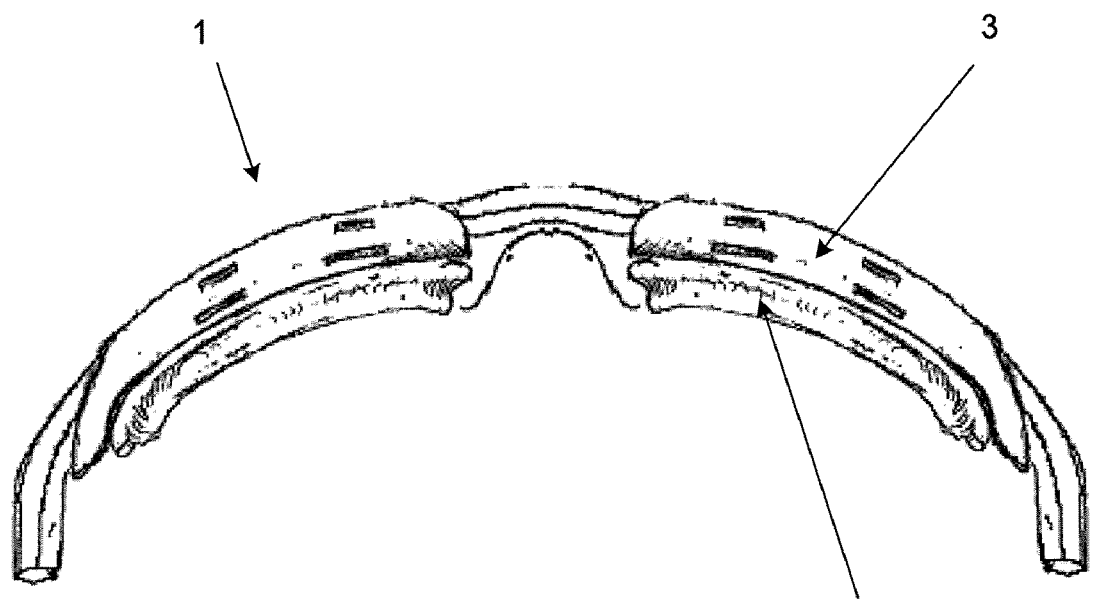
FIG. 9A shows a top view of FIG. 8A.
Figure 9B:
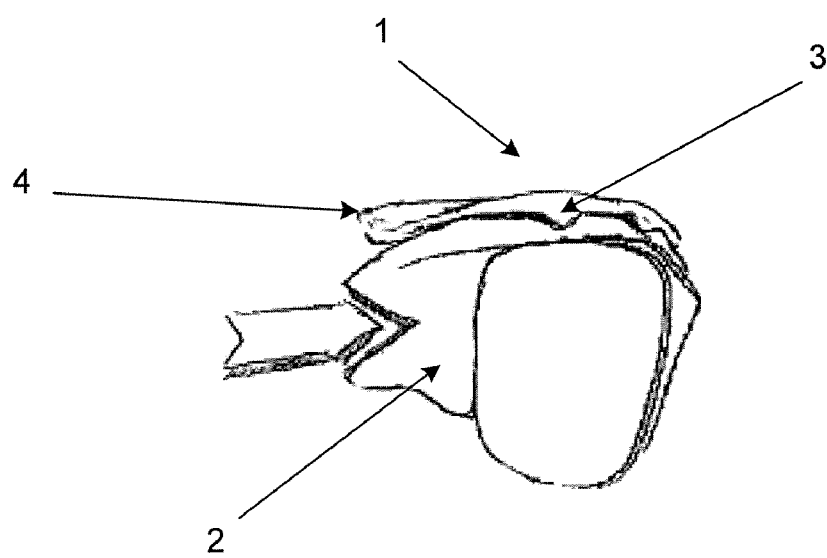
FIG. 9B shows a side view of FIG. 8A.
Figure 10A:
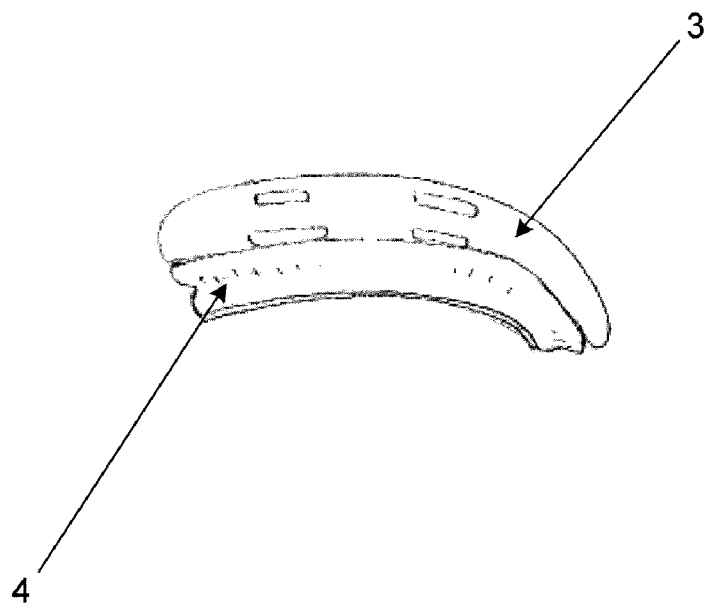
FIGS. 10A-E shows views of the present invention of FIG. 8A.
Figure 10B:
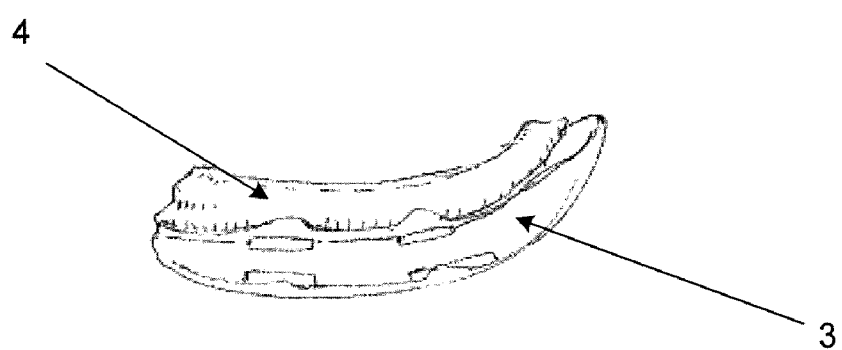
Figure 10C:
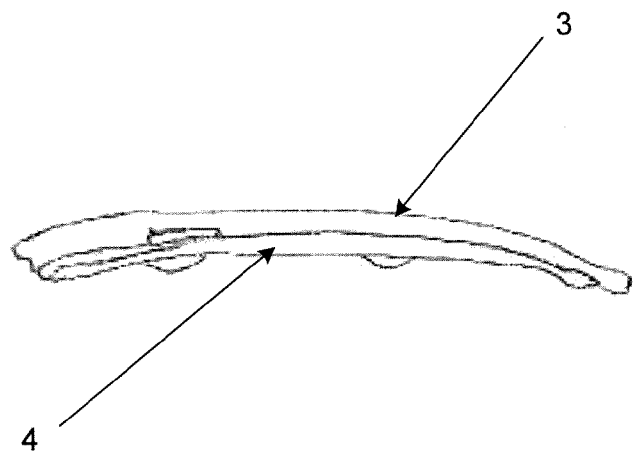
Figure 10D:
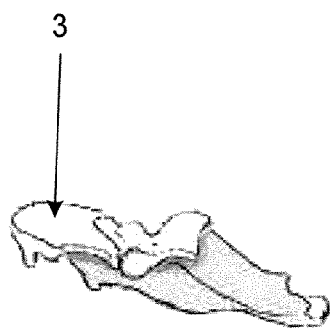
Figure 10E:
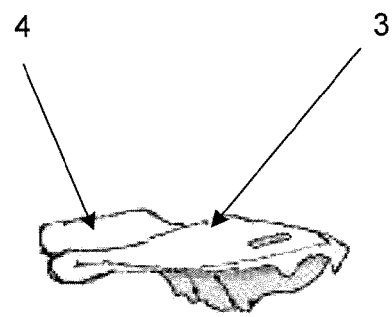

Referring now to the numerous figures, wherein like references identify like elements of the invention, FIGS. 1A and 1B illustrate an exemplary embodiment of the invention comprising one or more liners 1 attached to the top of the frame of a pair of glasses or sunglasses 2. The liner or liners 1 may be attached to the frame by a variety of means, including but not limited to an adhesive coating on the side of the liner 1 in contact with the frame, locking the liner 1 into place under the frame, or by means of a thin lip or tab 3 that snaps or otherwise fits over the top of the frame 2. The lip or tab 3 may be integral with the liner 1 or separate from the liner, with means to attach the liner 1 to the lip or tab device 3.

In an exemplary embodiment, the liner 1 extends from the frame 2 to be in partial or complete contact with the forehead or orbital area of the individual wearing the glasses. The liner 1 thus redirects sweat, water, lotion, or other fluids or debris from running into the eyes of the wearer. The liner 1 may be made of any suitable material that is water resistant and flexible, including but not limited to rubber, plastic, or foam, so that it conforms or contours itself with the curvature of the top portion of the frame 2 as well as the forehead or orbital area of the individual wearing the glasses.

The main section 7 of the liner 1 can be fashioned in a variety of shapes in cross-section, including but not limited to a circle, oval, rectangle, square, triangle or other polygon. The liner 1 may be solid or hollow. The liner 1 may be a single piece extending across the entire top of the frame 2, or two pieces extending across the top of each lens. In another exemplary embodiment, a flap 4 may extend from the rear edge of the liner 1 to ensure proper contact with the forehead or orbital area of the user. The flap 4 may extend for the entire length of the liner, or for only part of the length of the liner. The flap 4 may extend straight back from the liner, or may be angled as seen in FIGS. 1-4. The flap 4 also may be flared at one or both ends, as seen in FIGS. 1-4, so as to be longer than the liner 1 where the flap 4 contacts the wearer.

In yet another embodiment, one or more grooves 5 may be located in the top of the lining 1 to catch or channel sweat, water, lotion, or other fluids or debris to the side of the face, down and away from the eyes. The groove 5 may be a single groove extending across the entire lining 1, or two grooves, each extending over a portion of the lining 2.

In another exemplary embodiment, the lining 1 may be easily removed or replaced, and may be fashioned in a variety of shapes and lengths to conform to existing glasses and sunglasses. In yet another exemplary embodiment, the lining 1, when attached to the frame 2, is substantially hidden behind the frame 2 and cannot be easily seen from the front, thus preserving the original look and style of the particular glasses or sunglasses being worn.

Thus, the location of the lining 1 at the top of the frame 2 provides an effective mechanism for catching and redirecting moisture, perspiration, sweat, lotion and debris away from the eyes and down the side of the face without reducing the field of vision characteristics of the glasses or sunglasses for the consumer, and without restricting air flow behind the glasses or sunglasses. The glasses or sunglasses function normally, with no reduction in brightness, glare, or radiation protection. In particular, the invention avoids the increased heat and sweat associated with goggle-type equipment.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

I claim:

1. An apparatus adapted to be attached to a pair of glasses, comprising:
   one or more liners with a top side, front side and a back side, attached to the top of the frame of a pair of glasses, wherein said liner or liners extends for at least a portion of the length of the top of the frame; and
   means for attaching said liner or liners to the top of the frame;
   wherein said liner or liners do not extend substantially beyond the top of the frames when attached and the bottom of said frames remain open to permit air to circulate behind the glasses;
   further wherein said liner or liners do not extend along the earpieces of the glasses.

2. The apparatus of claim 1, wherein said liner extends for the entire length of the top of the frame.

3. The apparatus of claim 1, wherein there are two liners, each extending across the top of the frame above the two lens of the glasses.

4. The apparatus of claim 1, wherein said liner or liners are removably attached to the frame.

5. The apparatus of claim 1, wherein the attachment means comprises a lip or tab adapted to fit over the top of the frame.

6. The apparatus of claim 1, wherein the attachment means is an integral part of the front side of said liner.

7. The apparatus of claim 1, further comprising a flap extending from the back side of said liner.

8. The apparatus of claim 1, wherein the liner is adapted to come into contact with the forehead or orbital area of the person wearing the glasses.

9. The apparatus of claim 7, further wherein the flap is adapted to come into contact with the forehead or orbital area of the person wearing the glasses.

10. The apparatus of claim 1, wherein the liner is hollow.

11. The apparatus of claim 1, wherein the liner is flexible.

12. The apparatus of claim 7, wherein the flap is flexible.

13. The apparatus of claim 1, wherein the liner is water resistant or waterproof.

14. The apparatus of claim 7, wherein the flap is water resistant or waterproof.

15. The apparatus of claim 1, further comprising one or more grooves in the top side of the liner extending for at least a portion of the length of the liner.

* * * * *